United States Patent [19]  [11] 4,088,709
Seymour et al.  [45] May 9, 1978

[54] PHOSPHORUS STABILIZED-POLYESTER-POLYCARBONATE MOLDING COMPOSITIONS

[75] Inventors: Robert W. Seymour; James C. Weaver; Theodore F. Gray, Jr., all of Kingsport, Tenn.

[73] Assignee: Eastman Kodak Company, Rochester, N.Y.

[21] Appl. No.: 812,934

[22] Filed: Jul. 1, 1977

[51] Int. Cl.² ............................................. C08L 67/00
[52] U.S. Cl. .............................. 260/860; 260/45.7 P; 260/45.95 D
[58] Field of Search ............ 260/860, 45.7 P, 45.95 D

[56] References Cited

U.S. PATENT DOCUMENTS

| | | | |
|---|---|---|---|
| 3,047,608 | 7/1962 | Friedman et al. | 260/461 |
| 3,205,269 | 9/1965 | Friedman | 260/611.5 |
| 3,218,372 | 11/1965 | Okamura et al. | 260/860 |
| 3,305,520 | 2/1967 | Fritz et al. | 260/45.7 |
| 3,833,685 | 9/1974 | Wambach | 260/860 |

Primary Examiner—Richard B. Turer
Attorney, Agent, or Firm—Charles R. Martin; Daniel B. Reece, III

[57] ABSTRACT

Disclosed is a composition comprised of an admixture of poly(tetramethylene terephthalate), bisphenol A polycarbonate and selected phosphorous compounds.

4 Claims, 3 Drawing Figures

PHOSPHORUS STABILIZED-POLYESTER-POLYCARBONATE MOLDING COMPOSITIONS

This invention is a molding plastic comprised of an admixture of poly(tetramethylene terephthalate), bisphenol A polycarbonate and selected phosphorous compounds.

In recent years polyesters have gained wide acceptance as molding plastics. Today, a wide variety of polyesters are commercially available in molding plastic grades. In general, polyesters have gained wide acceptance as molding plastics because polyesters are easy to mold into articles which not only look appealing because of a generally smooth blemish-free surface, but also have an excellent overall balance of general mechanical properties.

In the last few years there has been increasing interest in polyester-type molding plastics that exhibit exceptionally high mechanical properties. One approach to formulating polyester-type molding plastics with exceptionally high impact strengths is to add major quantities of another high impact strength polymer to the polyester. One specific example of this approach is blends of poly(tetramethylene terephthalate) and bisphenol A polycarbonate. Blends of poly(tetramethylene terephthalate) and bisphenol A polycarbonate are well known in the art and are reported in Japanese 49/107354 and Japanese 48/54160, Japanese 50/34342 and U.S. Pat. No. 3,833,685.

Of all the approaches to obtaining a molding plastic that has exceptionally high mechanical properties, the blend of poly(tetramethylene terephthalate) and bisphenol A polycarbonate is perhaps the most promising. However, when bisphenol A polycarbonate is blended with poly(tetramethylene terephthalate) the general mechanical properties of the blend are not always a straight line relationship between the two homopolymers. For example, in some instances, the general mechanical properties decrease as the amount of bisphenol A polycarbonate increases up to about 25 weight percent and then increase as the amount of bisphenol A polycarbonate increases up to about 50 weight percent. Thus, the general mechanical properties can go through a distinct minimum when the amount of bisphenol A polycarbonate is around 25 weight percent.

We have now discovered that within the range of bisphenol A polycarbonate where the general mechanical properties go through a distinct minimum, selected types of phosphorous compounds enhance many of the mechanical properties. More specifically, we have now discovered that certain mechanical properties of blends of poly(tetramethylene terephthalate), 5 to 50 weight percent bisphenol A polycarbonate, and stabilizing amounts of selected phosphorous compounds are unobviously enhanced over the properties of either blends of poly(tetramethylene terephthalate) and bisphenol A polycarbonate containing no phosphorous compound or blends of poly(tetramethylene terephthalate) and bisphenol A polycarbonate containing phosphorous compounds which are closely related to the phosphorous compounds of applicants' invention.

Applicants are aware of a great deal of prior art relating to this technology. As reported above, blends of poly(tetramethylene terephthalate) and bisphenol A polycarbonates are well known in the art. In addition, blends of poly(tetramethylene terephthalate), bisphenol A polycarbonates and phosphorous compounds as flame retarders are reported in U.S. Pat. No. 3,218,372. Also, blends of polyalkylene terephthalates, bisphenol A polycarbonate and phosphorous stabilizers, such as triphenyl phosphite and phosphorous acid, are disclosed in U.S. Pat. No. 3,218,372. Still further, phosphorous compounds of the general type claimed by applicants are well known to be stabilizers for synthetic polymers, including polyesters and polycarbonates. For example, U.S. Pat. Nos. 3,047,608 and 3,205,269 disclose that a preferred species of applicants' phosphorous compounds, distearyl pentaerythritol diphosphite, is useful as a stabilizer for various types of synthetic polymers. Also, polyetheresters containing distearyl pentaerythritol diphosphite as a stabilizer have been sold commercially for several years. Still further, it is well known that phosphite compounds are effective stabilizers for polycarbonate. For example, U.S. Pat. No. 3,305,520 discloses that triphenyl phosphite can be used to stabilize bisphenol A polycarbonates.

The compositions of this invention are thought to be novel over the prior art because there is no single reference showing blends of poly(tetramethylene terephthalate) and 5 to 50 weight percent bisphenol A polycarbonate containing the specific claimed phosphorous compounds.

The compositions of applicants' invention are thought to be unobvious because the hardness, flexural strength and flexural modulus of the composition of this invention are unobvious over the values that would be expected of these compositions based on the hardness, flexural strength and flexural modulus of similar compositions containing either no phosphorous compound or containing phosphorous compounds that are similar to those claimed by applicants. Thus, the compositions of applicants' invention are thought to be unobvious because applicants have discovered that certain specific types of phosphorous compounds produce unobvious mechanical properties within a limited range of bisphenol A polycarbonate.

The precise manner in which the blends of this invention are unobvious in view of the prior art can be fully appreciated by considering FIGS. 1, 2 and 3. These figures are graphs of important mechanical properties of both the compositions of the invention as well as compositions of poly(tetramethylene terephthalate) and bisphenol A polycarbonate alone and compositions of poly(tetramethylene terephthalate) and bisphenol A polycarbonate and phosphorous compounds similar to those claimed by applicants.

Figure 1:
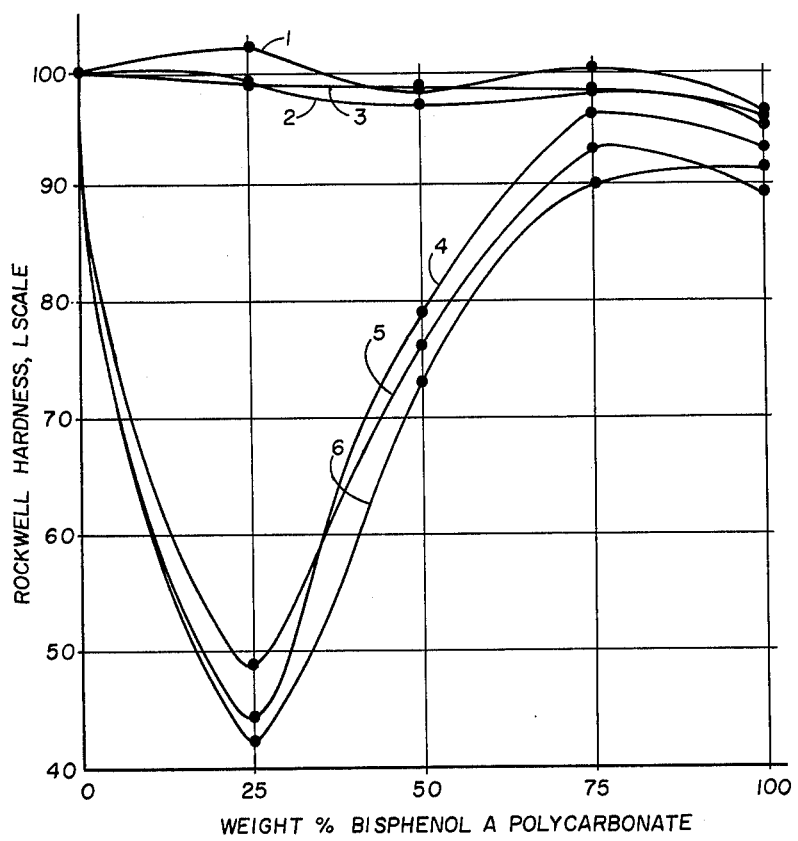
FIG. 1 illustrates the hardness of the compositions of the invention as well as those of the prior art.
Figure 2:
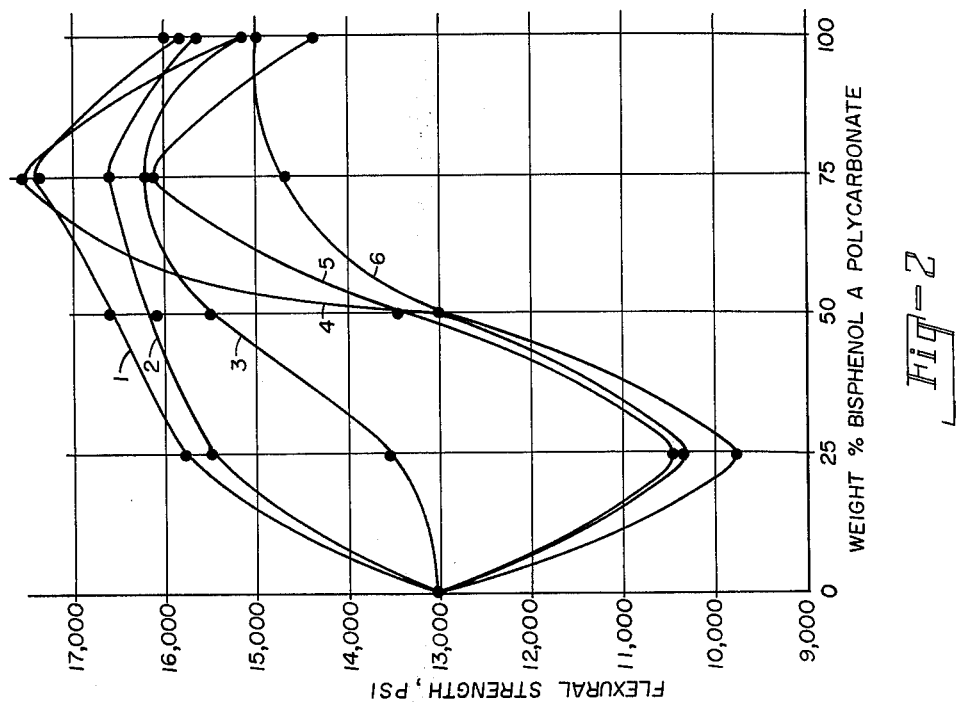
FIG. 2 illustrates the flexural strength of the compositions of the invention as well as those of the prior art.
Figure 3:
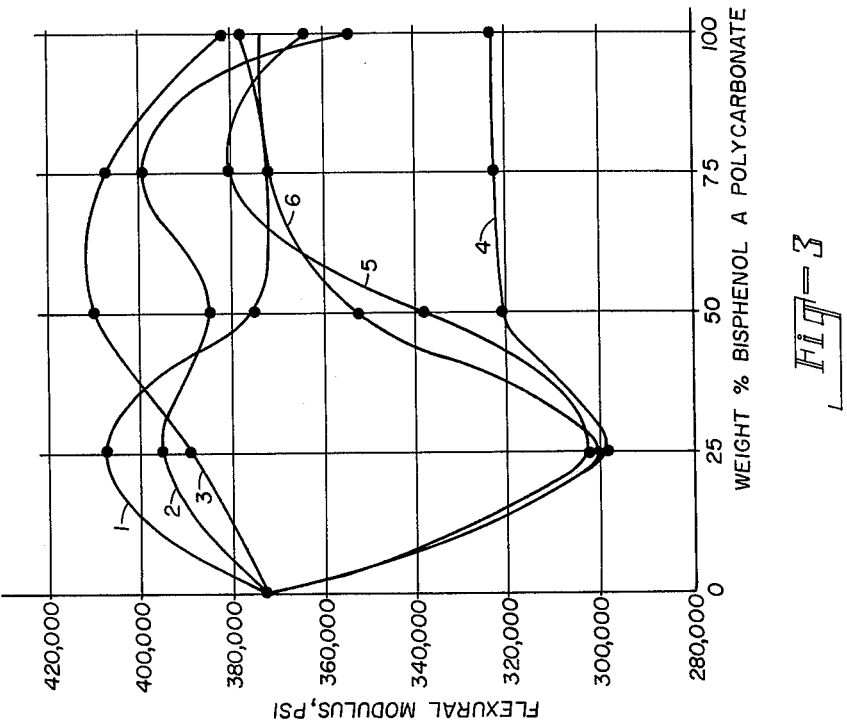
FIG. 3 illustrates the flexural modulus of the compositions of the invention as well as those of the prior art.

In FIGS. 1, 2 and 3 both the compositions of the invention and those compositions of the prior art which contain a phosphorous compound were prepared by extruding an admixture of pellets of TENITE Polyterephthalate 6PROA, a 1.14 inherent viscosity poly(tetramethylene terephthalate) commercially available from Eastman Chemical Products, Inc., varying quantities of Merlon M-40, a 0.54 inherent viscosity bisphenol A polycarbonate commercially available from Mobay Chemical Company, and different phosphorous compounds. Specifically, pellets of poly(tetramethylene terephthalate) and bisphenol A polycarbonate were ground to pass a 2 mm screen and the admixed with the phosphorous compound either as a powdered solid or a liquid. The compositions of the prior art which contain only poly(tetramethylene terephthalate) and bisphenol A polycarbonate are prepared as the other compositions except no phosphorous compound was used.

All the compositions were molded into test bars and several mechanical properties were determined. The hardness was measured as L Scale Rockwell Hardness and was determined in accordance with ASTM D-785. The flexural strength was measured in psi. and was determined in accordance with ASTM D-790. The flexural modulus was measured in psi. and was determined in accordance with ASTM D-790.

In FIG. 1 a graph of the relationship between the hardness of the compositions and the amount of bisphenol A polycarbonate in the compositions were prepared by plotting on the abscissa the weight percent bisphenol A polycarbonate, based on the combined weight of the poly(tetramethylene terephthalate) and bisphenol A polycarbonate, and plotting on the ordinate the values of hardness.

In FIG. 2 a graph of the relationship between the flexural strength of the compositions and the amount of bisphenol A polycarbonate in the compositions was prepared in a manner similar to FIG. 1.

In FIG. 3 a graph of the relationship between the flexural modulus of the compositions and the amount of bisphenol A polycarbonate in the compositions was prepared in a manner similar to FIG. 1.

The Figures can be better understood by understanding that the numbered lines in the Figures correspond to the following compositions.

| Line Number | Composition composed of poly(tetramethylene terephthalate), bisphenol A polycarbonate and the following phosphorous compounds |
|---|---|
| 1 | (CH₃)₂C(CH₂O)₂P—OCH₂CH₂OCH₂CH₂OCH₂CH₂O—P(OCH₂)₂C(CH₃)₂ |
| 2 | [H₁₉C₉—C₆H₄—O—]₃P |
| 3 | H₃₇C₁₈—O—P(OCH₂)₂C(CH₂O)₂P—O—C₁₈H₃₇ |
| 4 | [C₁₈H₃₇O]₂—P(=O)—CH₂—[2,6-di-tert-butyl-4-hydroxyphenyl] |
| 5 | [[2,6-di-tert-butyl-4-(—O—)phenyl]₂P—C₆H₅]₂ |
| 6 | None |

Referring now to FIG. 1, it is to be observed that the hardness of the composition of line 6, composed only of poly(tetramethylene terephthalate) and bisphenol A polycarbonate, initially decreases as the amount of bisphenol A polycarbonate increases. The hardness reaches a minimum around 25 weight percent bisphenol A polycarbonate, and then increases with increasing amounts of bisphenol A polycarbonate. As will be also appreciated from a consideration of FIG. 1, the hardness of two other compositions of the prior art containing phosphorous compounds that are similar to those claimed by applicants, represented by lines 4 and 5, follow much the same pattern as that of the blend of poly(tetramethylene terephthalate) and bisphenol A polycarbonate alone. Thus, it would be concluded from these data that compositions of either poly(tetramethylene terephthalate) and bisphenol A polycarbonate alone or compositions of poly(tetramethylene terephthalate), bisphenol A polycarbonate and similar phosphorous compounds would follow the same pattern. To state the conclusion another way, one would think that the same phosphorous compounds that are known in the art to enhance the mechanical properties of synthetic polymers are not effective in blends of poly(tetramethylene terephthalate) and 5 to 10 weight percent bisphenol A polycarbonate. Quite surprisingly, we have discovered that selected phosphorous compounds radically enhance the properties of compositions of poly(tetramethylene terephthalate) and 5 to 50 weight percent bisphenol A polycarbonate. Specifically, a composition of poly(tetramethylene terephthalate), bisphenol A polycarbonate and a phosphorous compound of the formula

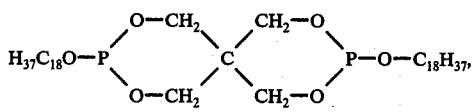

represented by line 3, is markedly enhanced over the compositions of the prior art. Similarly, another composition of the invention containing another selected phosphorous compound, represented by lines 1 and 2, produces a similar enhancement of hardness.

FIG. 2 is a graph similar to that of FIG. 1. In this Figure, the flexural strength of the compositions of the invention which contain the selected phosphorous compounds of the invention and are represented by lines 1, 2 and 3, is markedly enhanced compared to compositions of the prior art containing either no phosphorous compound, line 6, or containing phosphorous compounds similar to those of the invention, lines 4 and 5.

FIG. 3 is a graph similar to that of FIG. 1. In this Figure, the flexural modulus of the compositions of the invention which contain the selected phosphorous compound of the invention and are represented by lines 1, 2 and 3, is markedly enhanced compared to compositions of the prior art containing either no phosphorous containing compound, line 6, or containing phosphorous compounds similar to those of the invention, lines 4 and 5.

The composition of this invention is comprised of an admixture of a phosphorous compound and a polymeric component. The polymeric component is comprised of an admixture of poly(tetramethylene terephthalate) and bisphenol A polycarbonate.

The poly(tetramethylene terephthalate) used in the polymeric component of this invention is well known in the art and can be prepared from terephthalic acid and 1,4-butanediol, typically called tetramethylene glycol, in accordance with conventional procedures for preparing high molecular weight polyesters. Preferably, a dialkyl ester of terephthalic acid, such as dimethyl terephthalate, is ester interchanged with tetramethylene glycol to prepare bis 4-hydroxybutylterephthalate which is then polycondensed under reduced pressure and high temperature to form a high molecular weight polyester through the elimination of tetramethylene glycol.

The poly(tetramethylene terephthalate) has an inherent viscosity of at least 0.5, preferably at least 0.7, measured at 25° C. using 0.23 grams of polymer per 100 ml. of a solvent composed of 60 volumes of phenol and 40 volumes of tetrachloroethane.

The bisphenol A polycarbonate useful in the polymeric component of this invention is well known in the art and is described in U.S. Pat. No. 3,833,685.

The inherent viscosity of the bisphenol A polycarbonate is at least 0.3, preferably at least 0.5, measured at 25° C. using 0.23 grams of polymer per 100 ml. of a solvent composed of 60 volumes of phenol and 40 volumes of tetrachloroethane.

In this invention, the polymeric component is composed of from 95 to 50 weight percent poly(tetramethylene terephthalate) and from 5 to 50 weight percent bisphenol A polycarbonate, based on the combined weight of the poly(tetramethylene terephthalate) and bisphenol A polycarbonate. Preferably, the bisphenol A polycarbonate is 10 to 30 weight percent and the poly(tetramethylene terephthalate) is 90 to 70 weight percent.

The phosphorous compounds of this invention can be defined by five structures.

The first phosphorous compound corresponds to the structure

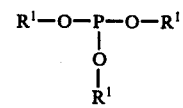

where $R^1$ is a monovalent alkyl radical having 2–18 carbon atoms, or a monovalent aryl or substituted aryl radical having 6–15 carbon atoms.

Examples of monovalent alkyl radicals having 2 to 18 carbon atoms include ethyl, n-propyl, n-butyl, 2,2-dimethylbutyl, 2,2-dimethylhexyl, n-pentyl, n-hexyl, 2-ethylhexyl, n-octyl, 2,2-dimethyloctyl, n-nonyl, n-decyl, dodecyl, 2,2-dimethyldecyl, stearyl, and the like. In this disclosure the term "alkyl" also includes cyclic alkyl, sometimes called alicyclic.

Examples of monovalent aryl or substituted aryl radicals having 6 to 15 carbon atoms include

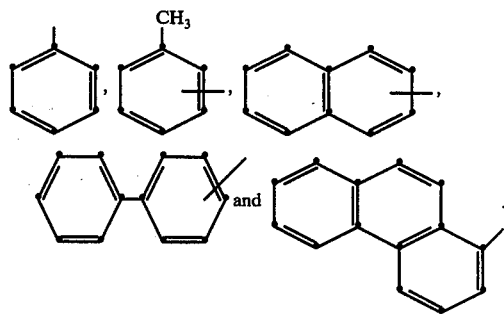

A particularly preferred compound is tris(nonyl phenyl)phosphite corresponding to the structure

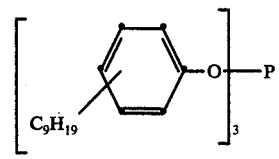

These compounds and methods for their preparation are well known in the art.

The second phosphorous compound corresponds to the structure

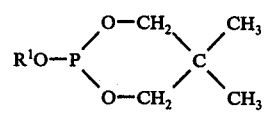

where $R^1$ is the same as above.

These compounds and methods for their preparation are well known in the art.

The third phosphorous compound corresponds to the structure $$R^2 \left[ -O-P(-O-R^1)(O-R^1) \right]_2$$

where
R$^1$ is the same as above, and
R$^2$ is a divalent alkyl radical having 2-12 carbon atoms or a divalent aryl or substituted aryl radical having 6-15 carbon atoms.

Examples of divalent alkyl radicals having 2-12 carbon atoms include ethylene, propylene, 2,2-dimethyl trimethylene, decamethylene, and the like.

Examples of suitable divalent aryl or substituted aryl radicals having 6 to 15 carbon atoms include

[phenylene, phenylene, methylphenylene, naphthylene, diphenylmethane, biphenyl structures]

These types of compounds and methods for their preparation are well known in the art.

The fourth phosphorous compound corresponds to the structure $$R^3 \left[ -O-P \begin{pmatrix} O-CH_2 \\ O-CH_2 \end{pmatrix} C \begin{pmatrix} CH_3 \\ CH_3 \end{pmatrix} \right]_2 \quad \text{where}$$

R$^3$ is a divalent alkyl or poly(alkylene oxide) radical having 2-12 carbon atoms or a divalent aryl or substituted aryl radical having 6-15 carbon atoms.

Examples of divalent alkyl radicals having 2-12 carbon atoms include ethylene, propylene, 2,2-dimethyl trimethylene, decamethylene, and the like.

Examples of divalent poly(alkylene oxide) radicals having 2-12 carbon atoms include $-(CH_2CH_2OCH_2CH_2)-$ , $-(CH_2CHOCH_2-CH)-$ , and
                                                                                        CH$_3$     CH$_3$ -continued
$-(CH_2CH_2CH_2CH_2OCH_2CH_2CH_2CH_2)-$ .

Examples of suitable divalent aryl or substituted aryl radicals having 6 to 15 carbon atoms include

[phenylene, phenylene, methylphenylene, naphthylene, diphenylmethane, biphenyl structures]

A particularly preferred compound is bis(neopentyl glycol)-triethylene glycol diphosphite corresponding to the structure $$\begin{array}{c} CH_3 \\ CH_3 \end{array} C \begin{array}{c} CH_2-O \\ CH_2-O \end{array} P-O-CH_2CH_2OCH_2CH_2OCH_2CH_2-O-P \begin{array}{c} O-CH_2 \\ O-CH_2 \end{array} C \begin{array}{c} CH_3 \\ CH_3 \end{array}$$

These compounds and methods for their preparation are well known in the art.

The fifth phosphorous compound corresponds to the structure $$R^1-O-P \begin{array}{c} O-CH_2 \\ O-CH_2 \end{array} C \begin{array}{c} CH_2-O \\ CH_2-O \end{array} P-O-R^1$$

where
R$^1$ is the same as above.

A particularly preferred compound is distearyl pentaerythritol diphosphite corresponding to the structure.

$$C_{18}H_{37}-O-P \begin{array}{c} O-CH_2 \\ O-CH_2 \end{array} C \begin{array}{c} CH_2-O \\ CH_2-O \end{array} P-O-C_{18}H_{37}$$ .

These compounds and methods for their preparation are well known in the art.

The compositions of this invention contains from 99.9 to 98.0, preferably 99.8 to 99.4, weight percent, based on the weight of the composition, of the polymeric component comprised of poly(tetramethylene terephthalate) and bisphenol A polycarbonate and from 0.1 to 2.0, preferably 0.2 to 0.6, weight percent of the phosphorous compound, based on the weight of the composition.

The compositions of this invention can be formed according to methods well known in the art, such as melt blending, extrusion, and the like. In a preferred embodiment, pellets of either poly(tetramethylene terephthalate) or bisphenol A polycarbonate are coated by tumbling the pellets with the phosphorous compound in the form of a powder and then the coated pellets are admixed with pellets of the other polymer. The admixture is then placed in the hopper of an extruder and the materials are extruded under high back pressure.

The compositions of this invention can be molded into various articles by conventional molding techniques, such as injection molding into molds at temperatures of less than 100° C. and preferably 20° C. to 50° C.

The composition of this invention can contain various other materials useful for modifying the properties of the composition. For example, the composition can contain mold release agents, glass fibers, flame retardants, pigments, stabilizers, extenders and numerous other materials commonly incorporated into molding plastics.

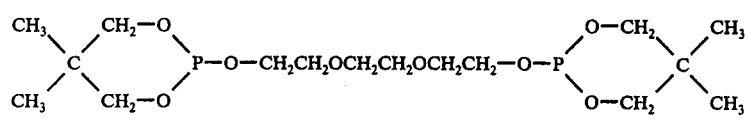

We claim:
1. A composition comprising an admixture of
   (A) from 99.9 to 98.0 weight percent, based on the weight of the composition, of a polymeric component comprising an admixture of
      (2) from 5 to 50 weight percent, based on the weight of the polymeric component, bisphenol A polycarbonate having an inherent viscosity of at least 0.3, and
      (2) from 95 to 50 weight percent, based on the weight of the polymeric component, poly(tetramethylene terephthalate) having an inherent viscosity of at least 0.5, and
   (B) from 0.1 to 2.0 weight percent, based on the weight of the composition which provides an improvement in the hardness, flexural strength and flexural modulus of said composition, of a phosphorous compound corresponding to the structure

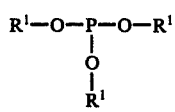

(1)

where
R¹ is a monovalent alkyl radical having 2-18 carbon atoms, or a monovalent aryl or substituted aryl radical having 6-15 carbon atoms,

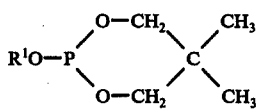

(2)

where
R¹ is the same as above,

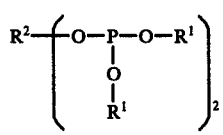

(3)

where
R¹ is the same as above, R² is a divalent alkyl radical having 2-12 carbon atoms or a divalent aryl or substituted aryl radical having 6-15 carbon atoms,

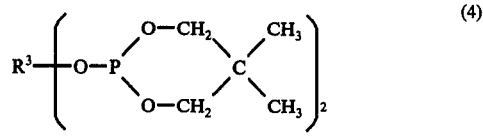

(4)

where
R³ is a divalent alkyl or poly(alkylene oxide) radical having 2-12 carbon atoms or a divalent aryl or substituted aryl radical having 6-15 carbon atoms, or

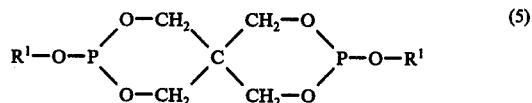

(5)

where
R¹ is the same as above.

2. The composition of claim 1 wherein the bisphenol A polycarbonate is from 10 to 30 weight percent and the poly(tetramethylene terephthalate) is from 90 to 70 weight percent.

3. The composition of claim 1 wherein the polymeric component is from 99.8 to 99.4 weight percent and the phosphorous compound is from 0.2 to 0.6 weight percent.

4. A composition comprising an admixture of
   (A) from 99.8 to 99.4 weight percent, based on the weight of the composition, of a polymeric component comprising an admixture of
      (1) from 10 to 30 weight percent, based on the weight of the polymeric component, bisphenol A polycarbonate having an inherent viscosity of at least 0.5, and
      (2) from 90 to 70 weight percent, based on the weight of the polymeric component, poly(tetramethylene terephthalate) having an inherent viscosity of at least 0.7, and
   (B) from 0.2 to 0.6 weight percent, based on the weight of the composition of a compound which provides an improvement in the hardness, flexural strength and flexural modulus of said composition and selected from the group consisting of
      (1) distearyl pentaerythritol disphosphite corresponding to the structure

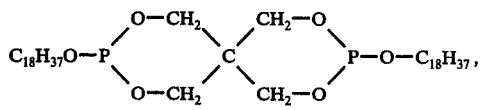

(2) tris(nonyl phenyl)phosphite corresponding to the structure

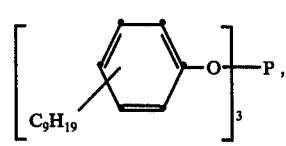

(3) bis(neopentyl glycol)triethylene glycol diphosphite corresponding to the structure